Patented Sept. 7, 1954

2,688,600

UNITED STATES PATENT OFFICE 2,688,600

MAGNESIUM ARSENATE PHOSPHOR ACTIVATED BY MANGANESE

Milan Maria Friedrich Leopold Travnicek, Graz, Austria, and Jan Lourens Ouweltjes and Ferdinand Anne Kröger, Eindhoven, Netherlands, assignors to Hartford National Bank and Trust Company, Hartford, Conn., as trustee No Drawing. Application October 4, 1950, Serial No. 188,532

Claims priority, application Netherlands April 6, 1950

9 Claims. (Cl. 252—301.4)

This invention relates to a material giving a red luminescence. Furthermore the invention concerns a method of producing such a material and electric discharge tubes provided with such a material.

As is known, luminescent materials are nowadays widely used for a great variety of purposes. They are of great importance in electric gas discharge lamps, in cathode-ray tubes for television, oscillography or radar-purposes, for use in luminous paints and for coating articles which are required to be visible in the dark, for example knobs of radio apparatus and pointers of measuring instruments.

The colour of the light emitted by luminescent materials may vary from deep blue to dark red. For almost every colour a number of materials is available from which a choice may be made, allowing for different conditions with respect to stability, dependence of temperature and so on. However, the choice of luminescent materials giving red luminescence upon irradiation with ultra-violet rays or electrons was very limited so that it is sought to extend their number.

The use of magnesium germanate activated by manganese is known. This material gives a red luminescence upon excitation by ultra-violet rays of very different wave-lengths, for example the mercury lines of wavelengths 2537 Å. and 3650 Å. It is stated that for obtaining a high efficiency there should be an excess of magnesium oxide over germanium oxide with respect to the ortho ratio.

A red luminescing material according to the invention is a fired reaction product activated by manganese and contains magnesium arsenic and oxygen and in which the gram-molecule ratio between magnesium oxide (MgO) and pentoxide of arsenic ($As_2O_5$) exceeds 3:1.

Red luminescing material according to the invention has the great advantage over the known magnesium germanate that it does not contain elements of which only small quantities are procurable and which are consequently very expensive. For practical uses on a big scale the use of a germanate is well-nigh excluded owing to the very high cost of germanium.

The material according to the invention is excited under ultra-violet rays of very different wavelengths, for example the mercury lines of 2537 Å. and 3650 Å., the efficiency of conversion exceeding that of known magnesium germanates. The red colour of the emitted light is substantially the same as that of the light emitted by the said germanates.

The red luminescing material according to the invention contains an excess of magnesium oxide over the arsenic oxide as compared with the ratio of these oxides found in magnesium-ortho-arsenate. It has been found that this excess may be very considerable, but preferably the mole ratio is between 8:1 and 10:1. Particularly good results are obtained with a mole ratio 9:1.

It has been found that magnesium ortho-arsenate does not give red luminescence under ultra-violet rays.

It is known that magnesium oxide activated by manganese gives a red luminescence under cathode-rays. However, this material cannot be brought to luminescene under ultra-violet rays.

The mechanism underlying the luminescence of red luminescing material according to the invention is not quite clear. It is possible to use a considerable excess of magnesium oxide although, as has been stated above, it is known that pure magnesium oxide does not luminesce under ultra-violet rays. Hence, the arsenic evidently plays an important role. It is not impossible that the material is made up of a magnesium-oxide phase, in which arsenic and manganese oxides are dissolved.

The fact that the material luminesces with widely differing quantities of magnesium oxide relatively to arsenic oxide is very advantageous, since this permits a great freedom in its production and it is not necessary to observe very strict limits.

The new red luminescing material has several further advantages. It is chemically very stable, so that it may also be used at higher temperatures, and the temperature dependence of the luminescence is very favourable i. e. a very large quantity of light is emitted even at high temperatures, in contradistinction to most luminescent materials, the luminous output of which usually decreases considerably with an increase in temperature. For example, the component with a ratio 9:1 still yields 100% at 100° C. and good 90% at 150° C. of the luminous output measured at room temperature. A special advantage is its very high quantum efficiency. A further advantage, referred to above, is the fact that the excitation spectrum is very wide. In effect, excitation can occur under electro-magnetic radiation, the wavelength of which extends far in the blue of the visible spectrum. Excitation under cathode-rays is also possible.

The aforesaid advantages render the material according to the invention very suitable for a great variety of purposes. Primarily, for example, in low-pressure mercury-vapour discharge tubes, wherein the most important radiation occurs at a wavelength of 2537 Å.

Not less important is its use in high-pressure mercury-vapour discharge tubes, wherein the radiation is emitted over a very large spectrum with maxima inter alia at 3537 Å., 3650 Å. and 4358 Å. By these rays the material is satisfactorily excited and gives a dark red luminescence. The quantum efficiency of this conversion is very high and may exceed 70%. The use of the material according to the invention permits the high-pressure mercury-vapour discharge lamp also to be used where a satisfactory colour reproduction is imperative.

Attempts have been made to improve the light of the high-pressure mercury-vapour discharge lamp, which is intense blue in itself, by the use of luminescent materials to render the colour reproduction satisfactory. Of course, it has been endeavoured to convert part of the ultra-violet rays of the lamp into red light. However, all the red luminescent materials hitherto available suffer from one or more disadvantages. Several of them give a sufficient red luminescence, but are chemically very unstable at high temperatures. Other materials have a poor temperature dependence. Furthermore, there are red luminescing materials which are suitable in this respect, but the intensity of their red luminescence is too low, and it is the high intensity of the red luminescence which is desirable to compensate the intense blue radiation. Since in high-pressure mercury-vapour discharge lamps of the usual size, the wall carrying the luminescent material attains a comparatively high temperature, it is vital that the luminescent material should be chemically stable at this higher temperature. In addition, of course, a satisfactory temperature dependence is necessary.

The red luminescing material according to the invention satisfies all of the said conditions. It has a high conversion efficiency, a satisfactory temperature dependence and a high chemical stability. Furthermore, it is very important that a considerable part of the very intense blue radiation having a wavelength of 4358 Å. is converted into red luminescence.

Furthermore, luminescent material according to the invention may be used in light-advertisement tubes and for other advertisement purposes, a screen containing this material being, for example, installed in a showwindow and caused to luminesce by means of a source of ultra-violet rays. In a similar manner it may be used for decors in theatres. Hitherto only few red-luminescing materials were available, the luminous intensity of which was comparable to the intensity readily obtainable with respect to other colours, for example green. With the joint use of several colours, the red colour was insignificant with respect to the green. With the use of the invention the ratio between the intensity of red and green light is much better.

Since excitation may alternatively occur under cathode-rays, the material may also be used for television, more particularly colour television.

The manganese content in a material according to the invention may vary between very wide limits. It may be chosen between 0.001 and 5 atom per cent with respect to the quantity of magnesium oxide. It is preferably chosen between 0.05 and 0.6 atom per cent, since in this case the maximum luminous efficiency is obtained.

The colour of the emitted light is practically not affected by the quantity of manganese. The radiation of the red component invariably has a maximum between 6300 Å. and 6700 Å.

The red luminescent material according to the invention may be made in very different manners, it being only essential to fire the material in an oxidising atmosphere. This is probably allied with the state of oxidation in which the manganese must be in the material.

According to a method also falling under the scope of the invention, a mixture of magnesium-containing compounds, arsenic-containing compounds and manganese-containing compounds, from which the manganese-containing red luminescing material is produced by firing, is heated at a temperature above 500° C. in an oxidising atmosphere. For the various compounds use may be made of the oxides of magnesium, arsenic and manganese or of compounds from which these oxides may be obtained by heating.

According to a further method, use may be made of a magnesium and arsenic containing compound which is fired, after adding a manganese-containing compound, at a temperature above 500° C. in an oxidising atmosphere. Such a compound is, for example, magnesium arsenite ($Mg_3(AsO_3)_2$).

Particularly good results are obtained when using for the production of arsenates according to the invention fluorine-containing compounds, for example magnesium fluoride, as a flux. Upon analysis of the compounds thus produced, it has been found that the ultimate product contains part of the fluorine contained in the flux. The use of fluxes yields a better state of crystallisation and a lower temperature of manufacture.

In all methods the ratio of the various components is naturally so chosen as to satisfy in the ultimate product the condition that the ratio between magnesium oxide and arsenic oxide exceeds 3:1.

A luminescent screen containing a material according to the invention may, in addition to the red luminescing component, contain other luminescent materials. These materials may emit light in the same or in other parts of the spectrum.

In order that the invention may be more clearly understood and readily carried into effect, it will now be explained more fully by giving a number of examples of manufacturing methods.

In all methods very pure starting materials are used, as is customary in the manufacture of luminescent materials. Furthermore, provision is made to divide the materials to a sufficient degree of fineness to ensure a satisfactory reactivity.

*Example 1*

A mixture of:

365 gms. of MgO
230 gms. of $As_2O_5$
2.3 gms. of $MnCO_3$ in 1.5 litres of water is ground in a ball mill. The suspension obtained is subsequently evaporated to dryness and the dry material is fired for one hour at a temperature of approximately 600° C. in air or oxygen. After that it is fired once more at 1100° C. for 16 hours, likewise in air or in oxygen.

*Example 2*

A mixture of:

365 gms. of MgO
230 gms. of $As_2O_5$
35 gms. of $NH_4F$
2.3 gms. of $MnCO_3$ is ground whilst adding 1.5 litres of distilled water in a ball mill. The suspension obtained is evaporated to dryness and prefired in air for one hour at a temperature of approximately 600° C., followed by further firing for three hours at a temperature of 1100° C. likewise in air.

*Example 3*

A mixture of:

365 gms. of MgO
200 gms. of $As_2O_3$
2.3 gms. of $MnCO_3$ is ground in a ball mill whilst adding water. The suspension obtained is evaporated to dryness and the dry product is fired at a temperature of 600° C. for ten hours in air followed by firing for 16 hours in air or in an oxygen atmosphere at approximately 1100° C.

*Example 4*

200 gms. of $As_2O_3$ are mixed with water and 0.5 litre of 30% $H_2O_2$ is added to the suspension which is slowly heated to its boiling point and warmed until all the arsenic oxide has been dissolved. After cooling, the suspension is filtered and the filtrate is introduced into an evaporator cup. Whilst stirring, 365 gms. of MgO and 2.3 gms. of $MnCO_3$ are added in parts. The substance is evaporated to dryness and the dry material is prefired for three hours in air at a temperature of approximately 600° C., whereupon it is further fired for 16 hours in air or in oxygen at a temperature of 1100° C.

If required, the materials obtained after heating, as stated in the examples, are ground and sieved and are then ready for use.

What we claim is:

1. A red luminescing material consisting essentially of the fired reaction product of magnesium oxide and arsenic pentoxide in the mol. ratio greater than 3:1 and less than 10:1 and manganese as an activator present in an amount of about 0.001 to 5 atom per cent with respect to the magnesium.

2. The composition of claim 1 in which the mol ratio of the oxides of magnesium and arsenic is between 8:1 and 10:1.

3. The composition of claim 1 in which the mol ratio of the oxides of magnesium and arsenic is about 9:1.

4. The composition of claim 1 in which the manganese content is between 0.05 and 0.6 atom per cent with respect to the magnesium.

5. The composition of claim 2 in which the manganese content is between 0.05 and 0.6 atom per cent with respect to the magnesium.

6. The composition of claim 3 in which the manganese content is between 0.05 and 0.6 atom per cent with respect to the magnesium.

7. A method of producing a red luminescent material comprising the steps of mixing magnesium, arsenic and manganese compounds in the proportions yielding upon firing a product containing magnesium oxide and arsenic pentoxide in a mol ratio greater than 3:1 and less than 10:1 and manganese in the proportion of about 0.001 and 5 atom per cent of the magnesium, and firing the mixture at a temperature exceeding 500° C. in oxidizing atmosphere for a time sufficient to react the magnesium, arsenic and manganese compounds.

8. A method of producing a red luminescent material comprising the steps of mixing magnesium oxide and arsenic pentoxide in a mol ratio greater than 3:1 and less than 10:1 and manganese oxide in a ratio of about 0.001 to 5 atom per cent of manganese to magnesium, and firing the mixture at a temperature exceeding 500° C. in an oxidizing atmosphere for a sufficient time to react the magnesium, arsenic and manganese oxides.

9. A method of producing a red luminescent material comprising the steps of mixing the magnesium oxide and arsenic pentoxide in mol ratio greater than 3:1 and less than 10:1 and manganese oxide in the ratio of about 0.001 to 5 atom percent of magnesium, adding a fluoride as a flux to the mixture, and firing the mixture at a temperature exceeding 500° C. in an oxidizing atmosphere for a sufficient time to react the oxides of magnesium, arsenic and manganese and the flux.

References Cited in the file of this patent

Comptes Rendus, v. 144, pp. 1040–1042 (1907).

Journal of the Optical Society of America, March 1950, v. 40, No. 3, pp. 179–180.